W. C. BUTLER.
Improvement in Cake-Pans.

No. 130,843. Patented Aug. 27, 1872.

Witnesses:
A. W. Almqvist
C. Sedgwick

Inventor:
Wm. C. Butler
PER
Attorneys.

UNITED STATES PATENT OFFICE.

WILLIAM C. BUTLER, OF LOUISVILLE, KENTUCKY, ASSIGNOR TO HIMSELF AND W. E. ARNOLD, OF SAME PLACE.

IMPROVEMENT IN CAKE-PANS.

Specification forming part of Letters Patent No. 130,843, dated August 27, 1872.

Specification describing a new and useful Improvement in Cake-Pan, invented by WILLIAM C. BUTLER, of Louisville, in the county of Jefferson and State of Kentucky.

Figure 1:
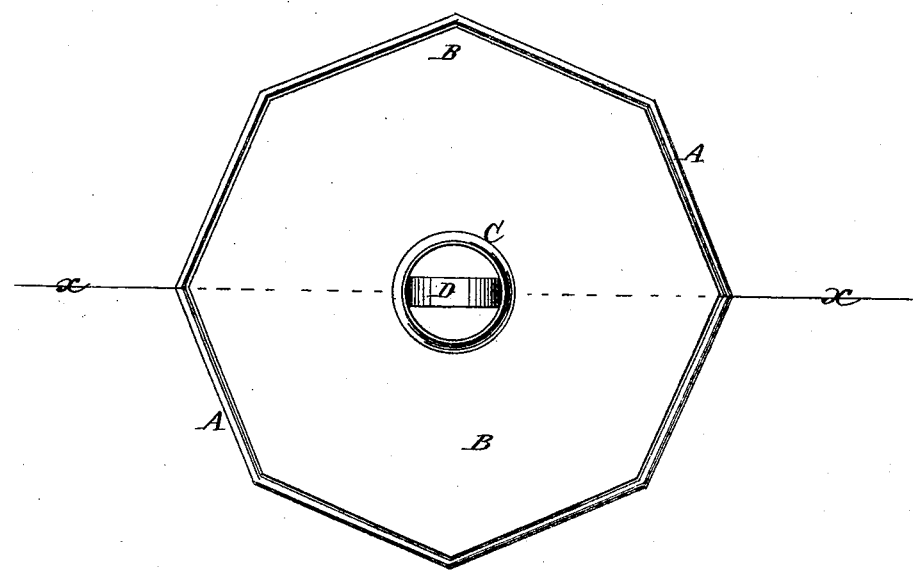
Figure 2:
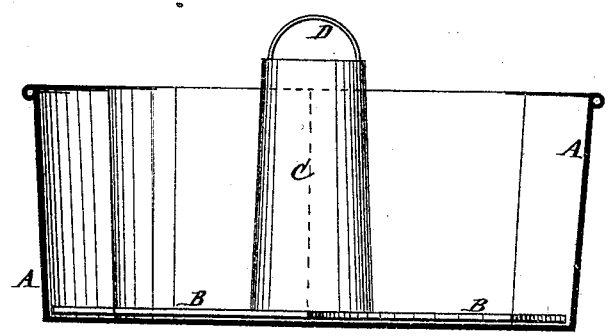

In the accompanying drawing, Figure 1 is a top view of my improved cake-pan. Fig. 2 is a detail sectional view of the same taken through the line $x\ x$, Fig. 1.

Similar letters of reference indicate corresponding parts.

My invention has for its object to furnish an improved pan for baking cake which shall be so constructed that the cake may be removed from the pan when baked without being broken even should it adhere to said pan; and it consists in the detached bottom and tube, constructed as hereinafter more fully described, to adapt it to be applied to a cake-pan.

A represents an ordinary bake-pan, which may be made with or without a bottom, and, when made with a bottom, may be with or without a center tube or hole in said bottom. The pan A may be polygonal, round, oval, or of any other desired form. B is a detached bottom, which fits into the lower part of the pan A and rests upon the bottom of said pan, as shown in Fig. 2. When the pan A is made without a bottom it should be provided with a flange or seat for the bottom B to rest upon when in position for baking. The bottom B is made with a center tube, C, which tube, when the pan A is made with a center tube, should be large enough to receive the tube of the pan A. The tube C at its upper end should be provided with a handle, D, as shown in Figs. 1 and 2.

With this construction, when the cake is baked, the bottom B, with cake resting upon it, may be raised from the pan by means of the tube C. This allows a knife to be inserted between the bottom B and the bottom of the cake, so that the cake may be separated and removed from said bottom conveniently, and without being broken in the least.

The bottom B and tube C may be applied to pans already in use with the same facility as to new pans.

Having thus described my invention, I claim as new and desire to secure by Letters Patent—

The detached bottom B and central tube C, constructed substantially as herein shown and described, to adapt them to be applied to an ordinary cake-pan, as and for the purpose set forth, whether said pan be made with or without a bottom.

WILLIAM C. BUTLER.

Witnesses:
JOHN ARNOLD,
W. E. ARNOLD.